W. E. URSCHEL.
PROCESS FOR SNIPPING STRING BEANS.
APPLICATION FILED DEC. 31, 1917.

1,256,491. Patented Feb. 12, 1918.
3 SHEETS—SHEET 1.

INVENTOR
William E Urschel
BY
Gustav Bising
ATTORNEY

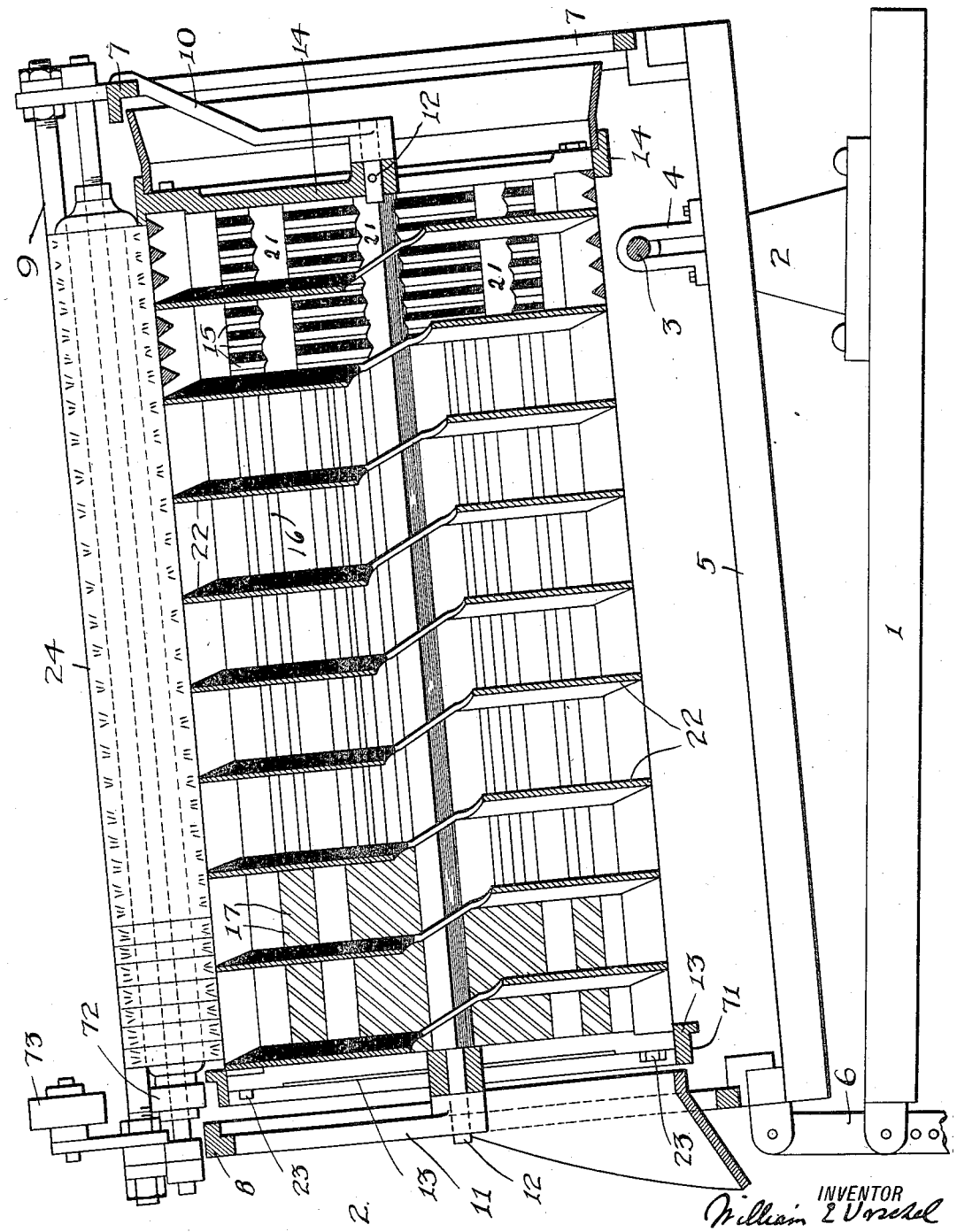

W. E. URSCHEL.
PROCESS FOR SNIPPING STRING BEANS.
APPLICATION FILED DEC. 31, 1917.
1,256,491.
Patented Feb. 12, 1918.
3 SHEETS—SHEET 3.
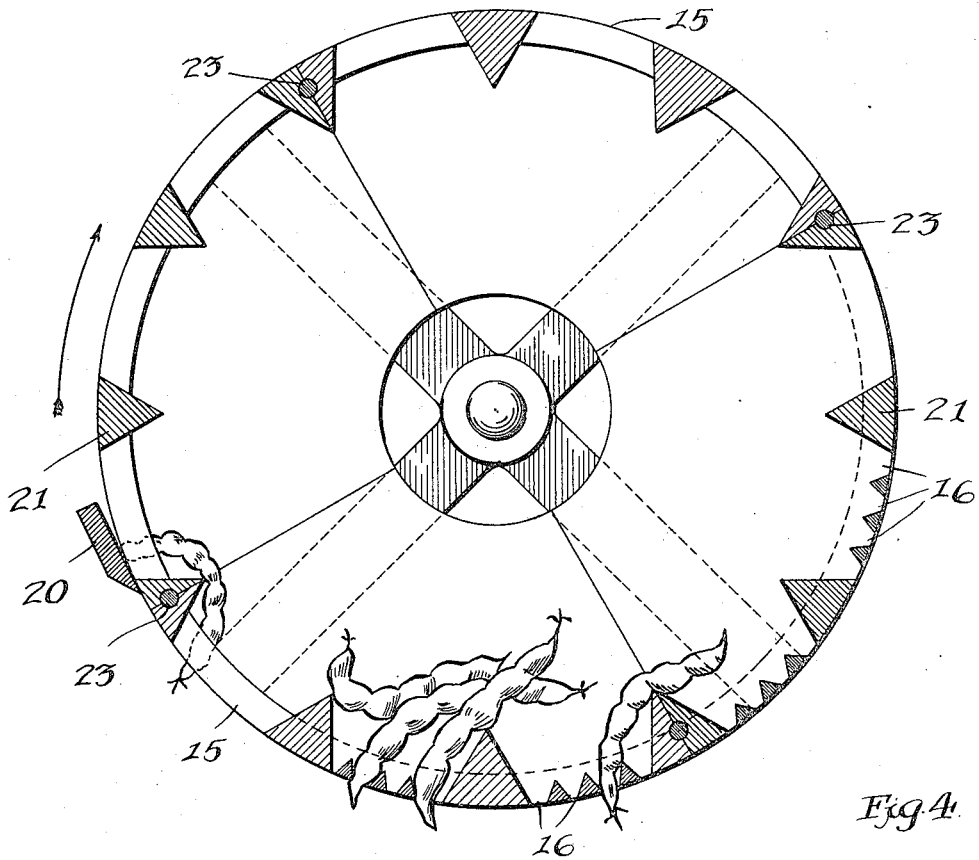
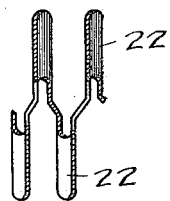
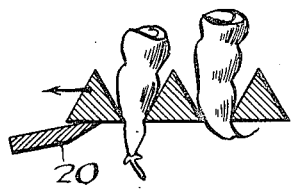
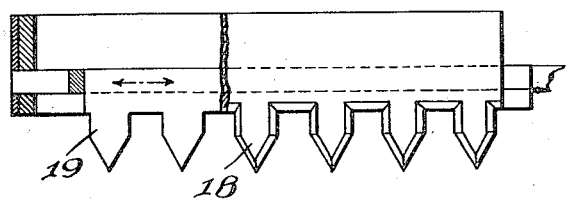

UNITED STATES PATENT OFFICE.

WILLIAM E. URSCHEL, OF VALPARAISO, INDIANA, ASSIGNOR TO CHISHOLM-SCOTT COMPANY, OF CADIZ, OHIO, A PARTNERSHIP.

PROCESS FOR SNIPPING STRING-BEANS.

1,256,491.     Specification of Letters Patent.     Patented Feb. 12, 1918.

Original application filed February 10, 1916, Serial No. 77,455. Divided and this application filed December 31, 1917. Serial No. 209,727.

*To all whom it may concern:*

Be it known that I, WILLIAM E. URSCHEL, a citizen of the United States, residing at Valparaiso, in the county of Porter and State of Indiana, have invented a new and useful Improvement in Processes for Snipping String-Beans, of which the following is a specification.

My invention relates to a process of cutting off or severing the ends of so-called string beans, whether these be of the string or stringless variety and whatever be their color, so that the beans, with their ends thus severed or snipped, may be utilized by canning or conserving factories or be otherwise used for food purposes. Various machines and procedures have been previously devised to snip string beans automatically as distinguished from cutting off their ends by hand but none, so far as known to me, have as yet come into commercial use. My process of snipping beans, on the other hand, has displaced hand labor and the product resulting from it is superior to that produced in the hand operation, for it secures a more uniform cutting, it can remove a smaller portion of the end than is usually done by the unskilled or careless hand operators and it wastes a smaller percentage of the pods in the mass.

My process utilizes the taper at each end of the bean to secure the desired result. In this way it does not rely on the general shape of the bean as a whole which is sometimes straight, sometimes twisted, sometimes curved or hooked, the variation of shape having had much to do with the difficulty of snipping off the ends by prior automatic procedures. My process is one of repetition. It promiscuously presents a mass of unsnipped beans to one side of a surface having perforations of a given and a suitable size so that some of the beans of the mass, because of their tapered or pointed ends, will each automatically project one tapered end through these perforations by an amount which is determined by the size of the hole and the amount of the taper. This permits a severing device, acting on the other side of the surface, to remove or snip off the protruding ends of those beans. The mass of the beans, now including some with one end sufficiently removed, are again and again promiscuously presented to the perforations. When any already sufficiently snipped end passes into a hole, what remains of its taper will necessarily be caught by some points in the bounding edge or surface of, at or near the hole, which points I shall briefly call the wall of the hole and will thus be prevented from passing far enough through the hole to again engage the cutting device. This insures that an end once sufficiently cut will not, at least to any substantial extent, be cut again. It is therefore essential to arrange matters so that the tapered end of the bean, while capable of protruding through a perforation to the desired extent is supported by the walls of the perforation against further protrusion so as not to be repeatedly cut.

In the meanwhile, however, other beans are passing their uncut, pointed and tapered ends through the perforations, by an amount determined by the character of the taper, and are being snipped so that the proportion of beans with cut ends in the mass is constantly increasing. At the same time the beans are caused to be reversed so that the mass undergoing treatment acquires an increasing proportion of pods both of whose ends have been snipped. By a sufficient continuation of this repetition process practically all the pods, over 95% as a rule, will be found to have both their ends snipped off. It is a rather curious fact, which I have discovered, that although the bodies of the beans vary so markedly in shape, the ends of the beans show little or no variation so far as those characteristics are concerned which are required to bring about their snipping by my process.

In order that the tapered ends of the beans may pass through the perforations in the surface already referred to, the mass of beans is agitated and tumbled about on this surface and in order to largely increase the opportunity for such passage the beans are raised and then allowed to slide or fall back toward the perforated surface. In their downward path, I cause them to upright, to some extent at least, so as to bring them more or less point-down toward the perforated surface, instead of allowing them to lie, roll or move about upon the surface flatwise which would give very little opportunity for having the ends of the beans enter the holes. As a result, although string beans are of various shapes, their effective snipping may always be successfully accomplished by my process since I do not utilize any character of the body of the bean but only such characteristics of its ends which inhere in practically all beans.

My process can be executed in a primitive way with a perforated plate and a knife in the hands of a workman, but for commercial purposes I naturally prefer more effective instrumentalities, a sample of which I have shown in the drawing in which, Figure 1 is a side elevation, the cutting devices being indicated conventionally.

Fig. 2 is a longitudinal central section;

Fig. 3 is a detail of one form of severing device;

Fig. 4 is a detail of a spiral or Archimedean screw which may be employed;

Fig. 5 is a transverse section of the operating cylinder, and

Fig. 6 is a detail showing the operation of snipping and of holding the tapered ends of the beans against further protrusion by the surrounding walls of the perforation.

Figure 1:
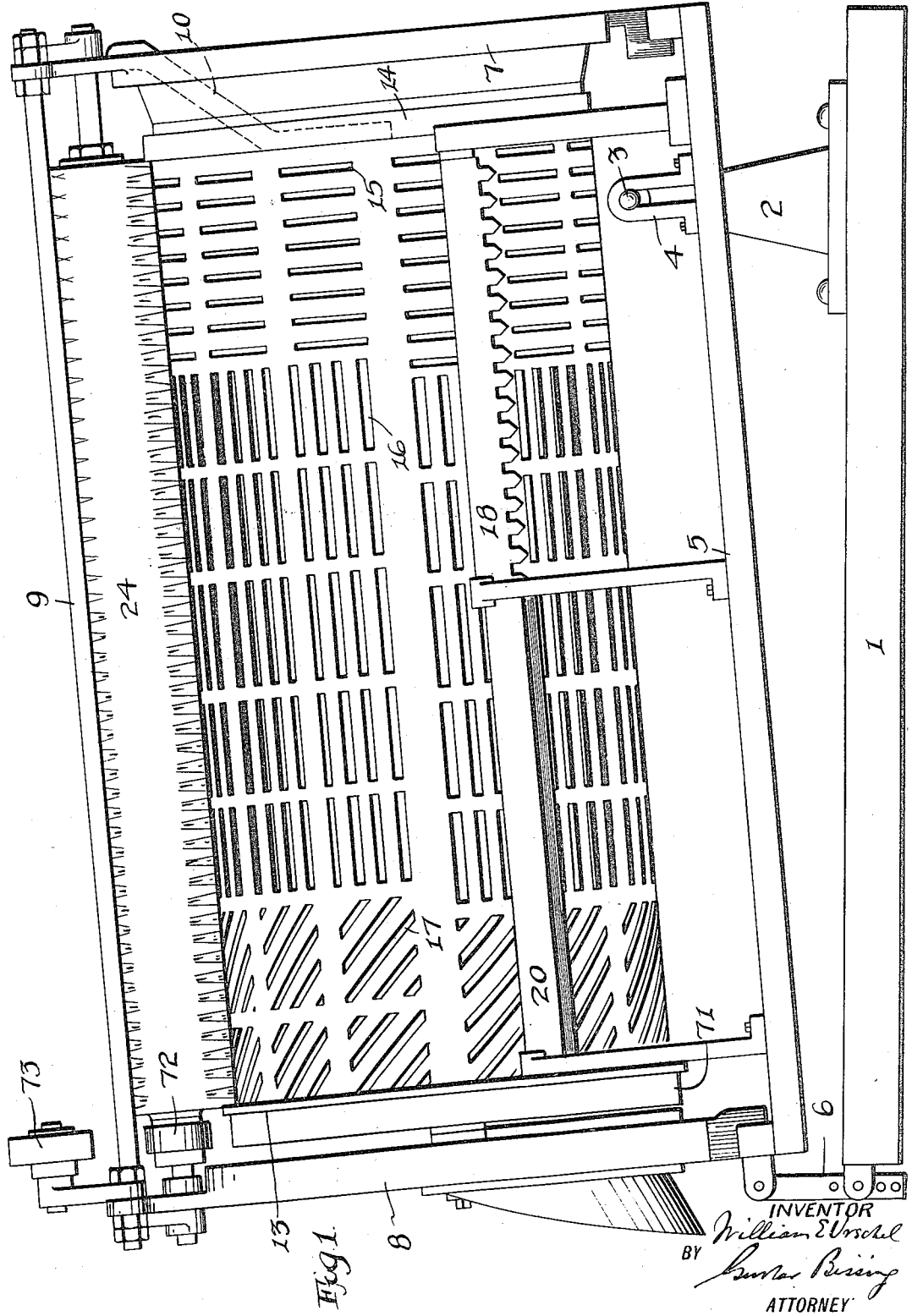

I shall not go into a very detailed description of the apparatus or show the driving mechanism or similar features which are within the skill of the mechanic.

There is a base plate 1, supporting brackets 2 which carry a shaft 3 from which hang supports 4 to which are attached one end of the frame 5, the other end of the frame being adjustably supported by links 6 from the end of the base plate. Thus the inclination of the frame 5 may be changed at will. To opposite ends of the frame 5 are secured the bottoms of annular castings 7 and 8, the tops of these castings being connected by tie rods 9 for greater rigidity. From the top of the annular casting 7 depends a bracket 10 and from the top of the annular casting 8 depends bracket 11 in the ends of which brackets the shaft 12 is supported.

This shaft 12 carries a cylinder in which the beans are treated. The cylinder consists of two end plates 13 and 14 which have spokes radiating from hubs supported on the shaft 12, and the plates 13 and 14, in turn, support the cylindrical surface of the drum which is provided with those perforations through which the ends of the beans project. Such perforations are shown in the shape of circumferentially running slots 15 near the feed end of the cylinder, in the shape of axially running slots 16 near the center of the cylinder and of diagonal slots 17 near the discharge end of the cylinder although I am not limited to having different shapes of openings in one cylinder. It will be seen from Figs. 5 and 6 that the inside of the openings 15, 16, 17 are tapered or beveled so as to flare outwardly toward the axis. This is a valuable feature assisting the ends of the beans to more readily protrude through the apertures.

Operating in connection with the perforation 15 and some of the openings 16, I have indicated a common type of harvester cutter in Fig. 3 which, as is well known, consists of a set of stationary teeth 18 having sharp cutting edges with reference to which a series of cutting teeth 19 reciprocate so that the part of the bean which projects through the slot in the cylinder will be caught between these two sharp teeth and be sheared off. I find it unnecessary to illustrate the mechanism for reciprocating the teeth 19 since such is most common and well understood and its illustration would tend to obscure the broad features with which I am here alone concerned. In coöperation with the diagonally placed holes 17 and some of the holes 16, I show a common stationary knife 20 which will, of course, be elastically pressed against the surface of the cylinder in some suitable manner, not necessary to specifically illustrate.

Running from end to end of the cylinder are longitudinal bars 21 which are shown as triangular or tapered in cross-section. It will be observed that the inner edges of any two adjacent bars are spaced apart by a distance which is less than the length of the bean. An inspection of Figs. 2 and 4 shows that the interior of the drum also carries an Archimedean screw or spiral 22. One purpose of this spiral or Archimedean screw is to gradually feed the beans from the feed to the discharge end; but this is subordinate for this feeding is also effected by the inclination of the cylinder. The more important function of this Archimedean screw or spiral, the adjacent plates of which, it will be observed, are also closer together than is the length of the bean, is to keep the beans to a greater or less extent crosswise of the cylinder in its rotation. The adjacent plates of the spiral and the adjacent longitudinal bars 21 thus form pockets in which a bean cannot lie flat. They must be more or less upright as seen in Fig. 5.

One of the many ways of making this drum is to build it in four quadrants, as shown in Fig. 5, the adjacent edges of the quadrants coming flush together and the four quadrants being secured by tie rods 23 running from end to end of the cylinder and fastening in its end plates 13, 14. Each of these quadrantal sections may have secured thereto its portion of the spiral 22, so that each quarter of the cylinder carries a number of longitudinally spaced apart quarters of the spiral, and the adjacent edges of the spiral will be made and register to form a complete spiral. It will be equally feasible to build the spiral into the cylinder as a whole.

I may say in conclusion that I can also use a rotary brush 24 at the edge of the cylinder so as to brush out any beans which happen to be stuck and that the end plate 13 is shown as provided with a circular or pulley surface 71, that the brush shaft carries a pulley 72 and that there is an idler pulley 73 over which pulleys a belt may be passed to drive these parts.

To execute my process, the cylinder is given a rotation at any desired speed short of that which will carry the beans around by centrifugal force. We will assume the rotation to be clockwise when looking into the feed end. The beans are now fed into the cylinder. The fact that the adjacent plates of the spiral are closer together than the lengths of the beans being treated causes the beans to lie more or less transversely to the length of the cylinder, which is the direction of axial feed. The rotation of the cylinder, because of the bars 21, will agitate the beans and tumble them about. What is more it will raise some of the beans to a position corresponding to 7 or 8 o'clock on the face of a clock. Such beans will then slide and tumble backwardly toward the bottom of the cylinder. Other beans may be carried up into the upper half of the cylinder say to the 10 o'clock position before they drop from the bars 21.

When such beans as slide, tumble or drop get to the bottom of the cylinder some of them, because of their transverse position, will be more or less upright and in position to have their lower ends enter perforations. The inner edges of the bars 21 will complete the uprighting for unless a bean straddles two adjacent bars, which is somewhat unusual, the inner edge of a bar 21 must come into contact with the bean at some point in the bean's body and hold that point away from the bottom formed by the perforated surface. But if a part of the body of the bean is held away from the bottom and one end of the bean is drawn to the bottom, by gravity, the bean is partially upright and is thus enabled to quite readily protrude its end through a perforation. If the bars 21 and the closely spaced plates 22 were dispensed with and no devices effecting similar functions were provided, the beans would be likely to roll flatwise on the bottom of the cylinder giving their ends but little opportunity to engage the perforations.

All this clearly appears from a study of Fig. 5. Take the bean shown to the left of the bar 21 in the five o'clock position. Were there no bar 21, that bean would more likely be lying flat against the surface of the cylinder with its end not projecting through the perforation 16. The chance of having the points of the bean get through the apertures 16 would be small. The fact that the bars 21 rise above the inside of the cylinder and are closer together than a bean-length gives a tilt to the bean and causes it to upright and thus very considerably increases the chance of having the point of the bean go through the aperture. In a repetition process like mine, however, it is highly desirable to have as large a portion of the beans as possible get into the apertures or perforations and be snipped, if not already snipped, so that the number of repetitions needed to get the end result will not be unduly large. In consequence I consider this step of uprighting the beans which includes partially uprighting them to an extent sufficient to effect the purpose intended as they slide, tumble or fall toward the apertures a very important feature of my process.

It will also be noticed that the process which I have devised makes no distinction between the two ends of the beans. The tumbling process is constantly reversing the position of the beans and thus presenting each end to the snipping apertures. This reversal of the position of the bean by the tumbling process in order to snip each end is also a feature of my invention.

This application is a division of my application No. 77455 filed February 10, 1916.

I claim:

1. The process of snipping string beans which consists in promiscuously presenting a number of them to perforations in a surface, whereby the tapered bean ends automatically pass into and protrude through and are then supported by the walls of the perforations against further protrusion by an amount depending on the taper; in severing the protruding ends; and in continuing to present the ends of the cut and uncut beans to the perforations, whereby the adequately cut bean-ends will not substantially protrude but the uncut bean-ends will protrude and be severed, substantially as described.

2. The process of snipping string beans which consists in presenting a number of them to perforations in a surface thus causing the ends of the beans to extend through the perforations; severing the projecting ends; tumbling the pods to reverse them so as to project the other ends through the perforations; and repeating this procedure with severed and unsevered beans until the desired result is attained, substantially as described.

3. The process of snipping string beans which consists in raising the pods above a perforated surface; letting them fall or tumble toward the surface; uprighting them in their downward path so as to bring them point-down toward and thus passing their ends part-way through the perforations; and in then severing the projecting ends, substantially as described.

In testimony whereof, I have signed my name to this specification, in the presence of two subscribing witnesses.

WILLIAM E. URSCHEL.

Witnesses:
FRANK GERBER,
THOMAS A. SCOTT.